Patented Nov. 12, 1935

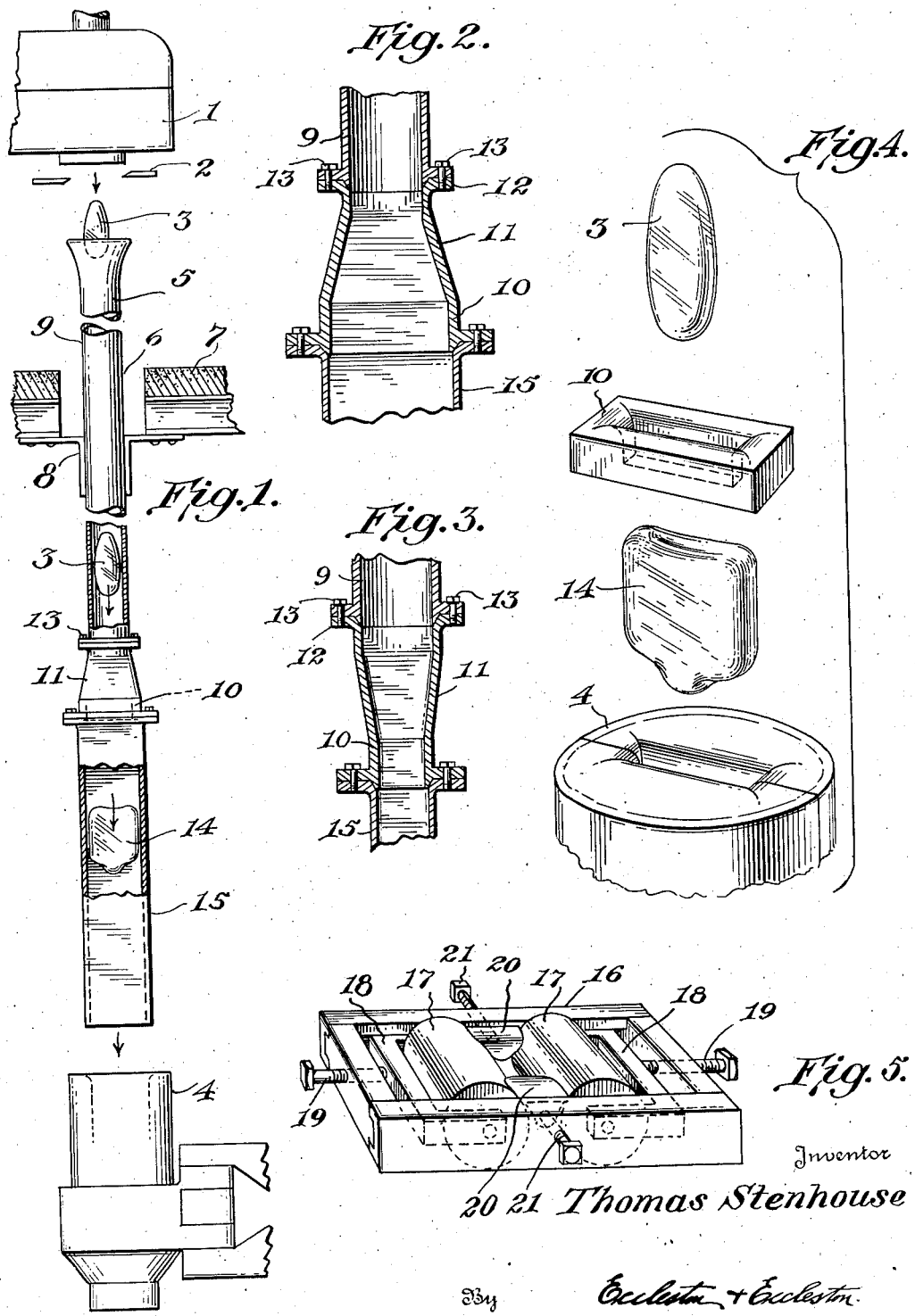

2,020,623

UNITED STATES PATENT OFFICE 2,020,623

METHOD OF MARVERING GLASS AND APPARATUS THEREFOR

Thomas Stenhouse, Washington, Pa., assignor to Hazel-Atlas Glass Co., Wheeling, W. Va., a corporation of West Virginia Application July 11, 1932, Serial No. 621,982

10 Claims. (Cl. 49—14)

In the old hand method of manufacturing bottles, the gather of glass was shaped by the marvering process to substantially the form of the final mold before the gather or parison was placed therein. This resulted in an even distribution of glass in the sidewalls, bottom and other parts of the bottle.

For many years past bottles have been made almost entirely by machinery; both the feeding of the charges and the formation of the bottle or other article being automatic. In the manufacture of bottles or other articles by machinery the glass is supplied to the parison by either of two old methods—sucking the glass up through the bottom of the parison mold, or dropping the glass down through the top of the parison mold. The present invention is concerned only with the latter method.

In the manufacture of bottles by the type of forming machine in which the charge of glass is dropped down through the top of the mold, such mold is circular or substantially circular in cross-section. The bottle is partially blown in this parison mold and then transferred to the blow mold or final mold. If the final shape of the article is circular or substantially circular in cross-section this method is satisfactory. The reason for this is obvious. The natural cross-sectional shape of a charge of glass being dropped into a mold is circular, and the cross-sectional shape of the parison mold is circular, so that all parts of the charge of glass come into contact with the walls of the parison mold at substantially the same instant. Likewise, the parison when formed is circular in cross-section, and the final or blow mold is circular in cross-section, so that when the parison is transferred to the blow mold and blown all parts of the parison will come into contact with the walls of the blow mold at substantially the same time. Hence, in the manufacture of round or substantially round articles there is no great difficulty in obtaining an even distribution of the glass in the blowing operation.

But in the manufacture of panel bottles, perfumery bottles, or in fact any bottle which is relatively wide and slender, considerable difficulty has been encountered by reason of the uneven distribution of glass. If, in the manufacture of such bottles, the parison mold were of substantially the same cross-sectional shape as that of the finished article, then this difficulty would be largely removed. But, as mentioned above, it has been impossible heretofore to have the parison mold of substantially the shape of a panel bottle or the like, because the cross-sectional shape of all glass charges is substantially circular, and when of sufficient size to give the required amount of glass they would be too large to enter a parison mold of the shape of a panel bottle.

From the foregoing it will be apparent that the problem has been to provide some method by which the charges would be of substantially the shape of the finished panel bottle or other bottle which was relatively wide and slender, so that the parison molds could be of substantially the same shape as the finished article. As stated hereinbefore, in the old hand method the charges were marvered to the proper shape.

In the present invention the usual two molds are used, but the parison mold is of substantially the shape of the final mold, and the charges before entering the parison mold are shaped to substantially conform with the shape of the parison mold. Prior to the present invention there has been no method, except the old hand marvering process, by which the charges, before entering the mold, could be formed into substantially the shape of a panel bottle, perfume bottle, or any other bottle which is relatively wide and slender. In the present invention this is accomplished by dropping the charge through a die before it enters the parison mold, as will now be described; reference being had to the accompanying drawing, in which, Figure 1 is a side elevational view of one form of apparatus for carrying out the process; parts of the apparatus being broken away.

Figure 2 is a vertical sectional view through the die and associated parts.

Figure 3 is a sectional view similar to Figure 2, but the section being taken at an angle of 90°.

Figure 4 is a diagrammatic illustration of the process; and

Figure 5 is a perspective view of a modified form of die.

The present invention is not limited to any specific mechanism, or is it limited to use in any particular method of or arrangement for feeding the charges to the forming machine, except that the charges must be dropped from above and preferably from a considerable distance above the forming machine. However, for the purpose of illustrating the present invention, it is shown in connection with the method of feeding charges disclosed in the patent to Flint No. 1,764,832, granted June 17, 1930. While as stated above the present invention is in no manner limited to use in connection with the feeding arrangement of the Flint patent the charges are dropped from an unusual height, in fact, they are dropped from a tank on the floor above into a forming machine on the floor below. The dropping of the charges through this long distance has been found to be very advantageous in actual practice; and while it is advantageous in the present invention, yet it is not essential.

Referring now to the drawing, and particularly to Figures 1, 2 and 3, numeral 1 indicates a conventional flow spout from which the molten glass is discharged. The usual shears 2 are employed for severing glass charges 3 which then fall into a mold 4 of a forming machine. The charge may be formed, prior to severance, by any desired feeding means, such as a reciprocating plunger feeder, or a pressure and vacuum feeder or any other desired feeder, or, the glass may merely flow through an orifice in the bottom of the flow spout and then be severed by the shears into charges or gobs of the required weight.

The gobs of glass in dropping from the flow spout to the mold may simply fall through space, but in the particular embodiment disclosed herein, where the gobs drop all the way from an upper floor to a forming machine on the lower floor, I prefer to employ a shield, such as referred to generally by numeral 5, to protect the gobs from air currents and also to protect the workmen. As shown in the drawing this shield extends from a point below the flow spout, through an opening 6 in the factory floor 7 where it is appropriately supported by brackets 8, to a point adjacent the forming machine.

The upper portion 9 of the shield is preferably circular in cross-section, as the charges are circular in cross-section; though of course it may be of any desired cross-sectional shape, just so it is large enough to permit the charges to drop freely through it. Or, as mentioned hereinbefore, the shield may be omitted.

Beneath the shield is a die 10, through which the charges pass. This die may be of any desired contour and of any desired form. The die shown in Figs. 1, 2 and 3 is of fixed form and is provided with an oblong opening of substantially the contour of the interior of the mold to be fed. Of course the opening in the die is somewhat smaller than that of the mold, so that the formed charge will freely enter the mold. In the manufacture of different shapes and for different sizes, different dies are employed, and consequently the die is preferably removable. It will be understood, of course, that any preferred means may be employed for so mounting the die that it may be readily removed and replaced. In the specific embodiment illustrated herein, walls 11 extend upwardly from the die, and these walls are flanged at their upper ends, as indicated by numeral 12; and this flange is removably secured to a similar flange at the bottom of the shield 9, by means of bolts 13. The die may be air cooled or water-cooled by any desired means.

The gob 3, circular in cross-section, after dropping from a considerable height will pass through the die and emerge therefrom in the proper shape to enter the mold; the charge after passing through the die being indicated by numeral 14. It will be understood that the die may be located at any desired distance below the flow orifice, and at any desired distance above the mold, but if the die is spaced considerably above the mold, a guide from the bottom of the die to a point just above the mold is desirable. Such a guide is shown in the present embodiment, and is referred to by numeral 15. It will be noted, by reference to Figures 2 and 3, that this guide in cross-section is wide in one direction and relatively narrow in the other direction. So that after the gob has been shaped by the die it will fall freely into the mold, but if it should tend to turn in any direction it will be restrained by the walls of the guide, and hence the charge will necessarily be in the proper position to enter the mold. If the die is not very far from the mold, a guide is unnecessary.

Of course the die may be of any desired construction, and in Figure 5 there is illustrated another form of die which may be substituted in place of the die 10. Many different kinds of dies could be used in carrying out the present invention, and the two forms are illustrated herein for the purpose of showing how widely different the dies may be, and not with any intention of limiting the invention to any particular die. Referring now to Figure 5, numeral 16 refers to the frame in which two rollers 17 are mounted. These rollers are spaced the proper distance so that there is a relatively long and narrow slot between them, to give the proper shape to the charge as it passes therethrough. To vary the thickness of the shaped charge it is only necessary to move the rollers toward or from each other. This adjustment may be had by mounting the rollers in yokes 18 which are movable back and forth in appropriate grooves in the frame by means of the threaded rods 19. For the purpose of determining the width of the formed charges, blocks 20 are arranged between the rollers, and these blocks may be adjusted toward or from each other by threaded rods 21.

For the purpose of more clearly illustrating how the method is carried out, and also to make it clear that the present invention is not limited to any particular apparatus, there is represented diagrammatically in Figure 4 a charge of glass as it is delivered from the feeder, a die, the same charge of glass after it has passed through the die, and the mold of a forming machine about to receive the formed charge. Referring now to this figure, the gob 3 has been delivered from any type of feeder, or, in fact, it could be supplied by hand feeding as by severing the charge from the end of a punty. The particular form of feeding is not material to the present invention, for however the gobs may be delivered they will be circular or substantially circular in cross-section. The object of the present invention is to so change the shape of these gobs or charges that they will approximate the shape of the interior of the parison mold to which they are fed. Of course the invention is not limited to any particular shape of the charge or of the parison mold, and the rectangular shape of the interior of the mold shown in Figure 4 is merely for the purpose of illustrating one desired form. As mentioned hereinbefore the present invention is particularly for use in the manufacture of oval bottles or rectangular bottles, panel bottles, perfume bottles, etc.

The distance the charge 3 drops before encountering the die 10 will, of course, vary in different installations, but it is desirable that the distance be such that the gob will have obtained considerable velocity. The gob will strike the die and pass quickly therethrough, its shape being changed from a circular cross-section to the cross-sectional shape of the particular die through which it passes. In this particular instance the gob will be oblong in cross-section after it passes through the die. In the short interval of time between the feeding of the gob and its reaching the die, a skin will have formed on the gob, and by reason of this skin, the gob will retain the shape imparted to it by the die during the instant required for the shaped gob to reach the mold. The mold may be spaced only a short distance below the die, or a considerable distance therebelow. But whether this distance is one foot or fifteen feet, the gob will retain the shape imparted to it by the die, and consequently when it enters the mold it is of substantially the shape of the mold. It is unnecessary to repeat here the advantages of thus being able to use a parison mold of substantially the shape of the final mold, and being able to shape the charges to an oval, oblong or similar cross-sectional shape to fit a similar shaped parison mold, to thereby form panel bottles, or perfume bottles or any other bottles which are slender in comparison with their width, with an even distribution of the glass in the blowing operation, which has been impossible heretofore in machine operation, and the desirability of which has been long recognized in the glass industry.

Having fully described the invention, what I claim as new is:

1. The method of marvering glass to fit a mold prior to entering the mold which comprises dropping vertically from above a charge of glass substantially circular in cross-section, and while the charge is freely falling through space by gravity causing it to pass of its own momentum through a die changing its cross-sectional shape to fit the mold.

2. The method of marvering glass to fit a mold prior to entering the mold which comprises dropping vertically from above a charge of glass substantially circular in cross-section, the charge dropping freely through space a sufficient distance to attain a high speed, and while rapidly dropping causing it to pass of its own momentum through a die without stopping and at high velocity, thereby changing its cross-sectional shape to fit the mold, and thereafter dropping the charge a sufficient distance to permit the charge through space to regain a more uniform temperature before entering the mold.

3. The method of manufacturing small bottles having relatively large and small transverse axes such as panel bottles, perfume bottles and the like, which comprises dropping vertically from above a charge of glass substantially circular in cross-section, and while the charge is freely falling through space by gravity causing it to pass of its own momentum through a die without stopping and at high velocity, thereby imparting to the charge a shape substantially that of the finished bottle.

4. The method of manufacturing small bottles having relatively large and small transverse axes such as panel bottles, perfume bottles and the like, which comprises dropping vertically from above toward a parison mold having substantially the shape of the finished bottle, a charge of glass substantially circular in cross-section, the charge dropping freely through space a sufficient distance to attain a high speed, and while dropping causing it to pass of its own momentum through a die without stopping and at high velocity, thereby imparting to the charge a shape substantially the shape of the mold, the charge thereafter dropping into the mold.

5. The method of manufacturing small bottles having relatively large and small transverse axes such as panel bottles, perfume bottles and the like, which comprises dropping vertically from above toward a parison mold having substantially the shape of the finished bottle, a charge of glass substantially circular in cross-section, the charge dropping freely through space a sufficient distance to obtain a high speed, and while rapidly dropping causing it to pass of its own momentum through a die without stopping and at high velocity thereby imparting to the charge a shape substantially the shape of the mold, and thereafter dropping the charge through space a sufficient distance to permit the charge to regain a more uniform temperature before entering the mold.

6. Apparatus for marvering glass in the manufacture of small bottles having relatively large and small transverse axes such as panel bottles, perfume bottles and the like, including a parison mold having substantially the shape of the finished article, a feeder above the mold and delivering charges substantially circular in cross-section, a fixed die arranged in the path of the falling charges, said feeder spaced above the die a sufficient distance to cause the charges to gain a high velocity before reaching the die, said die provided with a passage to change the charges from a circular cross-sectional shape to substantially the cross-sectional shape of the finished bottle, said die spaced above the mold and spaced below the feeder, and a vertical guide of substantially the cross-sectional shape of the finished bottle leading from the die to the mold.

7. Apparatus for marvering glass including a feeder for delivering gobs of glass, a mold located a substantial distance below the feeder, and a die arranged in the path of the falling gobs, said die including a pair of spaced rollers.

8. Apparatus for marvering glass including a feeder for delivering gobs of glass, a mold located a substantial distance below the feeder, and a die arranged in the path of the falling gobs, said die including a pair of spaced rollers, and means for varying the space between the rollers.

9. Apparatus for marvering glass including a feeder for delivering gobs of glass, a mold located a substantial distance below the feeder, and a die arranged in the path of the falling gobs, said die including a pair of rollers having an opening therebetween, and blocks closing the ends of said opening.

10. Apparatus for marvering glass including a feeder for delivering gobs of glass, a mold located a substantial distance below the feeder, and a die arranged in the path of the falling gobs, said die including a pair of rollers having an opening therebetween, blocks closing the ends of said opening, and means for adjusting said blocks to vary the length of the opening.

THOMAS STENHOUSE.